United States Patent [19]

Shepherd

[11] Patent Number: 5,135,356
[45] Date of Patent: Aug. 4, 1992

[54] SWASHPLATE ANTI-DRIVE LINKAGE FOR ROTOR CONTROLS OF ROTARY WING AIRCRAFT

[75] Inventor: David S. Shepherd, Wallingford, Pa.

[73] Assignee: The Boeing Company, Seattle, Wash.

[21] Appl. No.: 589,658

[22] Filed: Sep. 28, 1990

[51] Int. Cl.[5] .......................................... B64C 27/605
[52] U.S. Cl. ...................................... 416/114; 416/98
[58] Field of Search ............. 416/98, 102, 147, 148, 416/168 R, 104; 74/60, 103

[56] References Cited

U.S. PATENT DOCUMENTS

| | | | |
|---|---|---|---|
| 2,978,037 | 4/1961 | Focke | 416/102 |
| 3,008,525 | 11/1961 | Jensen | 416/147 |
| 3,378,083 | 4/1968 | Lichten et al. | 416/98 |
| 3,841,586 | 10/1974 | Broadley et al. | 74/60 |
| 4,525,123 | 6/1985 | Curci | 416/114 |
| 4,952,120 | 8/1990 | Aubry et al. | 416/98 |

Primary Examiner—Edward K. Look
Assistant Examiner—Michael S. Lee
Attorney, Agent, or Firm—Jones, Tullar & Cooper

[57] ABSTRACT

An anti-drive device for restraining against rotation the stationary ring of a rotor control system of a rotary wing aircraft includes a drive tube driveably connected to an engine through a transmission, a rotating ring driveably connected to the drive tube and supported on the stationary ring, pitch links connecting the rotating ring to pitch arms of a rotor that supports rotor blades for rotation and for pivoting motion, and a four bar linkage connecting the stationary ring to the transmission casing. The linkage defines a nearly linear path along which its attachment to the stationary ring travels as the rotor and control system are axially displaced along the rotor shaft and angularly tilted in accordance with the selective actuation of control servos attached to the stationary ring.

12 Claims, 3 Drawing Sheets

SWASHPLATE ANTI-DRIVE LINKAGE FOR ROTOR CONTROLS OF ROTARY WING AIRCRAFT

BACKGROUND OF THE INVENTION

1. Field of the Invention

This invention pertains to the field of rotor controls for a rotary wing aircraft, particularly to a tilt rotor aircraft, one whose rotor plane position changes between substantially horizontal and vertical planes. The invention relates to a device for restraining a stationary ring or swashplate against rotation and for permitting relatively lengthy linear displacement and large tilt angles of the swashplate.

2. Description of the Prior Art

The rotor control system for a helicopter or a tilt rotor aircraft includes a rotor on which blades, capable of producing aerodynamic lift or thrust, are rotatably mounted. The angle of attack of the aerodynamic surface of the blades with respect to the airstream is changed by rotating the blades with respect to a reference pitch axis through control input forces applied by pitch links attached to the blades eccentric of the pitch axis. The opposite end of the pitch links are connected to a rotating ring or swashplate driveably connected to a main rotor shaft. The shaft is driven through sets of meshing gears contained in a casing of a transmission, which reduces the speed of the main rotor shaft in relation to the speed of an engine connected to the transmission input.

In order to tilt the rotor while operating in the helicopter mode, i.e., with the rotor in a substantially horizontal plane, the pitch of each blade is changed individually as it rotates. This is called cyclic pitch. However, in order to change the amount of lift or thrust produced by the main rotor, the pitch of all blades can be changed concurrently and by the same amount. This is called collective pitch.

A control system to produce these effects includes a stationary ring surrounding the main rotor shaft, which ring can be raised, lowered or tilted by action of control servos or actuators. A rotating ring is attached to the stationary ring through bearings that allow relative rotation between the rings and maintain elevation and tilt of the rotating ring and rotor identical with those of the stationary ring. The rotating ring carries pitch links extending to each blade so that elevation and tilt of the rings effects pitch changes at the blades. Elevation of the stationary ring and rotating ring axially along the rotor shaft and tilting of these rings angularly with respect to the rotor shaft are produced by hydraulic actuators or servos, a longitudinal servo and multiple lateral servos, connected to the stationary ring at positions spaced angularly about the axis of the rotor shaft.

Conventionally the stationary ring includes a fourth attachment where a stationary scissors assembly is connected to the ring and to the upper surface of the transmission casing. This scissors permits the stationary ring to raise, lower and tilt according to the effect of the control servos, but the scissors prevents rotation of the ring.

However, where the range of axial movement of the stationary ring is large, a conventional scissors assembly is correspondingly large, heavy and occupies more space than is available to accommodate it. The problem of space limitation is especially acute when collective pitch is low, i.e., when the scissors is retracted or folded, rather than extended.

An alternate device for preventing rotation of the stationary ring includes a long, cantilevered channel having a "C" cross section, extending from the top of the transmission casing to the farthest extremity to which the stationary ring must travel to accommodate axial displacement and tilting. A roller attached to the radially outer surface of the ring moves within the channel and transmits to the channel a force required to restrain the ring against rotation. Due to the long distance between the point where the restraining force is applied to the stationary ring and the reaction to this force on the transmission casing, a large bending moment is developed in the channel. Due to the eccentricity between the shear center of the channel and the point of application of the force, a large torsion load is developed in the channel. These bending and torsion loads operate to deflect and twist the channel and require that the channel be large and heavy in order to minimize deflections and transmit the loads to the base of the channel.

SUMMARY OF THE INVENTION

In a tilt rotor aircraft, the stationary ring is required to travel a substantially greater distance, approximately 14 inches during transition from helicopter to airplane modes, along the rotor shaft to produce collective pitch and to tilt through a greater angle, approximately 14 degrees forward and rearward, to produce cyclic pitch, than the corresponding distance and angle through which the ring must move in a conventional helicopter rotor system.

The anti-drive linkage of this invention minimizes weight and size of the rotor control system, prevents rotation of the stationary ring and accommodates requisite linear and angular displacements of the rotor control relative to the rotor shaft. In realizing these objectives, the linkage includes a four bar linkage mounted at its base on a transmission casing, or other suitable immovable position, located preferably adjacent the lower surface of the stationary ring.

The anti-drive device for restraining against rotation the stationary ring of a rotor control system of a rotary wing aircraft can be applied to a rotor control system that includes a drive tube driveably connected to an engine through a transmission, a rotating ring driveably connected to the drive tube and supported on the stationary ring, and pitch links connecting the rotating ring to pitch arms of a rotor that supports rotor blades for rotation and for pivoting motion. Control servos, connected to the stationary ring, raise, lower and tilt the rotor in accordance with the extent to which they are lengthened and shortened in response to rotor control commands of the pilot.

The anti-drive device of this invention may be in the form of a four-bar linkage having an attachment for connection to the stationary ring. The linkage traverses a nearly linear path, along which its attachment to the stationary ring travels as the rotor and control system are axially displaced along the rotor shaft and angularly tilted in accordance with selective actuation of the control servos attached to the stationary ring.

The anti-drive linkage includes a first bar pivotably connected to the stationary ring at a location distant from the center of the stationary ring. A second bar and a third bar are each pivotally connected to the first bar at first attachments located along the second bar and third bar. These first attachments are spaced along the first bar from the location of the connection between the first bar and the stationary ring. The second bar and the third bar are also pivotably connected at second attachments spaced along the second bar and third bar from the first attachments.

The linkage permits unrestricted angular tilting of the stationary ring and rotor, subject to restraint inherent in operation of the control servos. The linkage restrains the stationary ring against rotation without restricting axial displacement and angular tilting of the stationary ring.

DESCRIPTION OF THE PREFERRED EMBODIMENT

Figure 1:
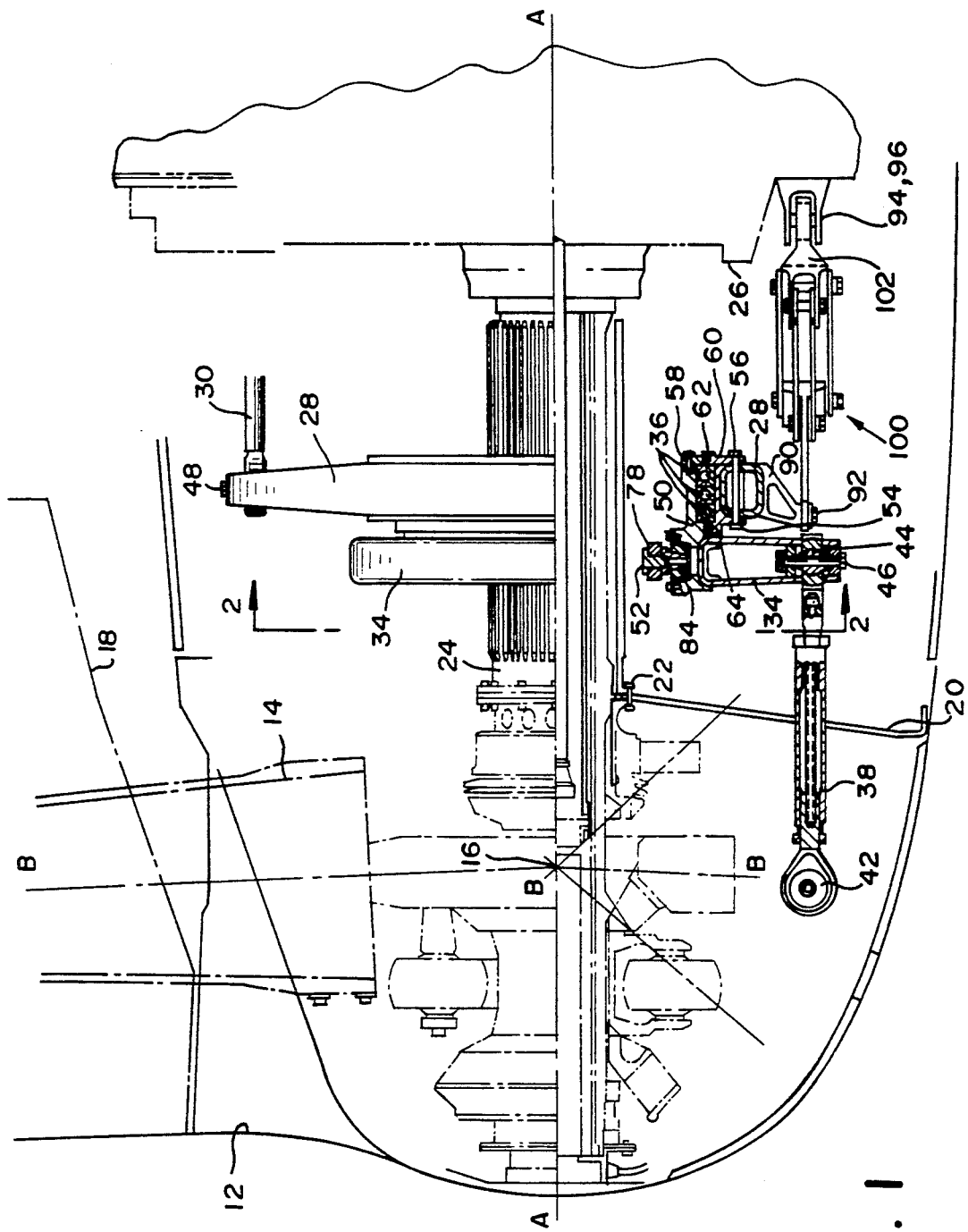
FIG. 1 is a side view, partially in cross section taken at plane 1—1 of FIG. 2, of the rotor and rotor control system for a tilt wing aircraft to which the anti-drive assembly of this invention may be applied.

Referring first to FIG. 1, a spinner assembly 10 forms a shroud or cover over the rotor and controls of a tilt rotor aircraft. The spinner has three radially directed openings 12, through each of which a rotor arm 14 extends toward from the rotor center or hub 16. Each rotor arm supports a radially extending rotor blade 18, along which a fairing surface is carried to produce aerodynamic lift as the blade passes at high speed through the air stream surrounding the rotor plane. Each blade is supported on the rotor for rotation about the longitudinal axis A—A of the main rotor shaft and for pitching movement about axis B—B, the pitch axis of each rotor arm. For a given mass flow rate of air over the blade surfaces, as the pitch angle of the blades increases, the magnitude of lift developed by the rotor increases.

The spinner is driven by rotatably by a spinner drive ring 20, joined at attachment 22 to a swashplate drive tube 24. A transmission casing 26, containing multiple pairs of meshing gears forming a drive train reduces the speed of the transmission output, which is connected to drive tube 24, relative to the speed of an engine connected to the transmission input.

Figure 2:
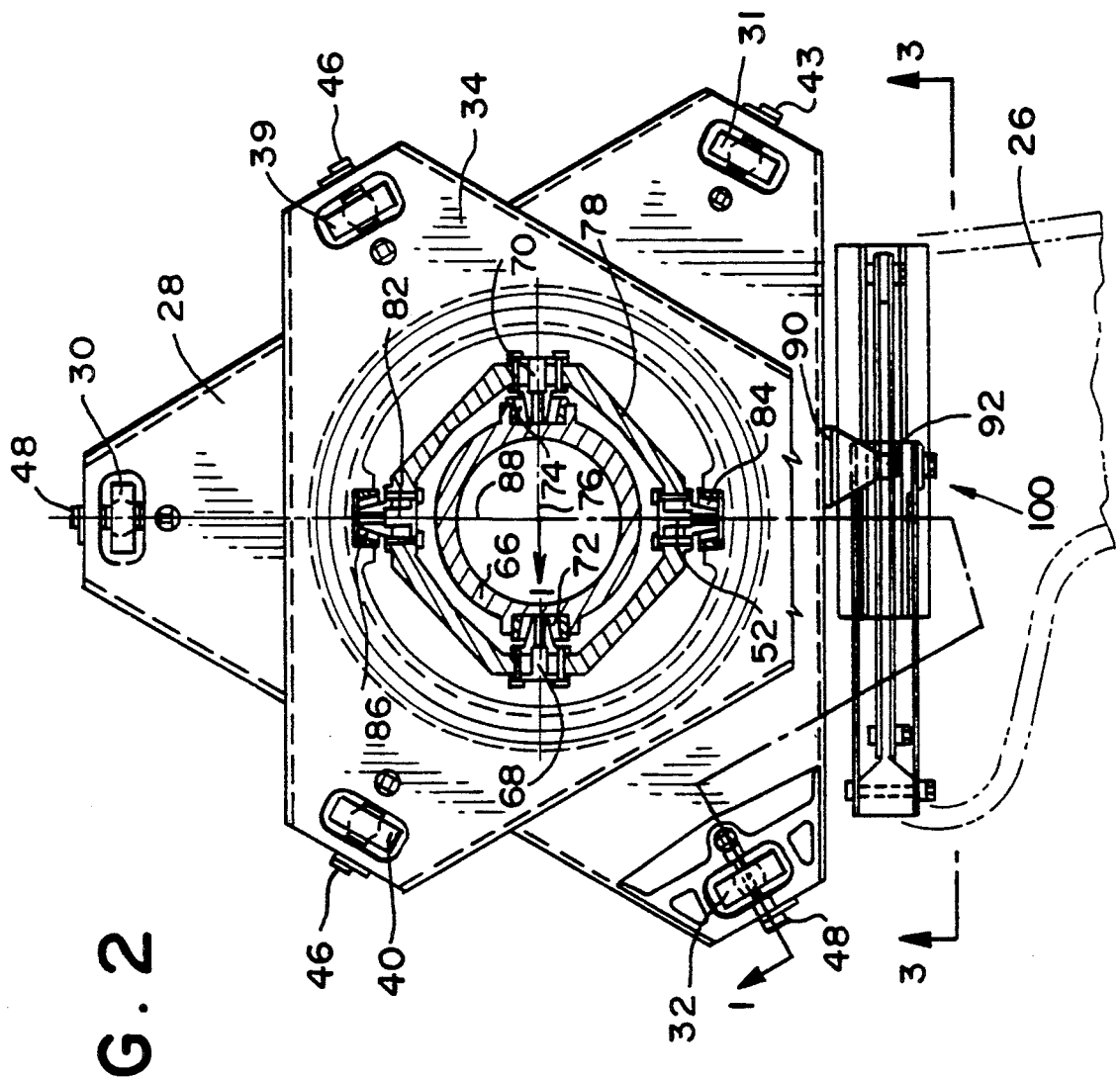
FIG. 2 is a view taken at plane 2—2 directed toward the swashplates of the control system shown in FIG. 1.

A control system includes a stationary ring 28 surrounding the drive tube, but not driven by the tube. The ring is raised, lowered or tilted by action of control servos or actuators 30-32, connected to ring 28 at positions radially spaced from, and angularly distributed about, the axis of the drive tube, as shown in FIG. 2. A rotating ring 34, driveably connected to the drive tube 24, is attached to the stationary ring 28 through bearings 36 so that elevation and tilt of the rotating ring 34 is identical with that of the stationary ring 28.

The angle of attack or pitch angle of the rotor blades changes in accordance with axial displacement and tilt angle of the rotating ring 34 transmitted to the blades by pitch links 38-40, as ring 34 is raised, lowered and tilted by action of the control servos. Each pitch link is connected to a rotor arm 14 and to the rotating ring 34 at positions radially spaced from, and angularly distributed about, the axis of the drive tube. Each pitch link includes a universal joint located at a longitudinal extremity of the link. Rotating ring 34 and the rotor arms 14 include clevis attachments, whereby the universal joints of the pitch links are connected by bolts 46 to the ring and rotor arms. Similarly each control servo includes a universal joint located at each of its longitudinal ends, by means of which bolts 48 connect the servos to the stationary ring 28.

A bearing housing 50, located at the radially inner side of rings 28, 34, is fixed by a trunnion pin 52 to the rotating ring, and a bearing retainer 54 is connected to the stationary ring 28 by bolts 56 spaced angularly around a bolt circle. The bearing housing defines a space containing the bearings 36, held in position by bearing retaining rings 58, 60 and closed by seals 62, 64. The outer bearing race contacts housing 50; the inner bearing race contacts retainer 54. Antifriction bearing elements, located between the races, facilitate rotation about the line connecting the centers of the bearing elements. The bearing, housing and retainer connect rings 28 and 34 mutually for movement as a unit in any other directional sense.

The outer surface of tube 24 is formed with axial splines by which a trunnion 66 is driveably connected to the tube. The trunnion is supported pivotally on pins 68, 70 by elastomeric gimbal bearings 72, 74 for angular movement about a first transverse axis 76. Pins 68, 70 connect trunnion 66 to a swashplate gimbal ring 78, which is supported pivotally on pins 52, 82 by elastomeric gimbal bearings 84, 86 for angular movement about a second transverse axis 88. This arrangement of gimbal bearings, trunnion, and swashplate gimbal ring permits unrestricted axial displacement and angular tilting of the rotating ring 34 and stationary ring 28 about any transverse axis relative to drive tube 24 and rotor hub 14.

Figure 3:
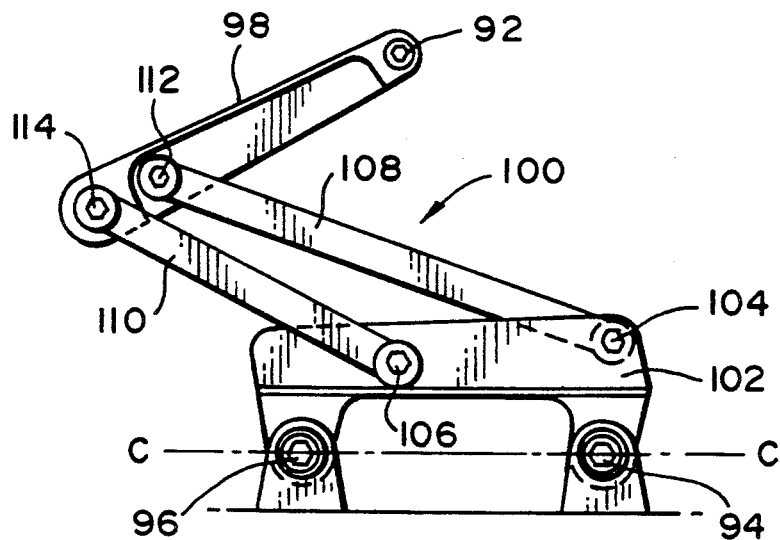
FIG. 3 is a side view taken at plane 3—3 in the direction indicated in FIG. 2 of the anti-drive linkage of this invention in a partially extended position.

An anti-drive swashplate linkage attachment bracket 90, fixed to the outer periphery of stationery ring 28, extends radially outward to a bolted attachment linked 100, shown in detail in FIG. 3. The linkage is fixed to the upper surface of the transmission casing 26 by spherical bearings in clevis attachments 94, 96. The linkage 100 includes a first bar 98 having one end fitted with a universal rod end bearing, connected by attachment 92 to bracket 90. A second bar 102 of the linkage is connected to the transmission casing at attachments 94, 96 and includes two pinned connections 104, 106 whereby attachments are made to a third bar 108 and a fourth bar 110. The opposite ends of bars 108, 110 are similarly pinned to bar 98 at pinned attachments 112, 114.

As the rotating ring, rotor and upper controls rotate, drag forces, transmitted through bearings 36 to the stationary ring, tend to turn that ring also. The anti-drive linkage resists this rotation by applying a radial force opposing rotation to bracket 90 at attachment 92. This force is transmitted through the linkage to reactions at clevis attachments 94, 96 on the transmission casing.

Figure 4:
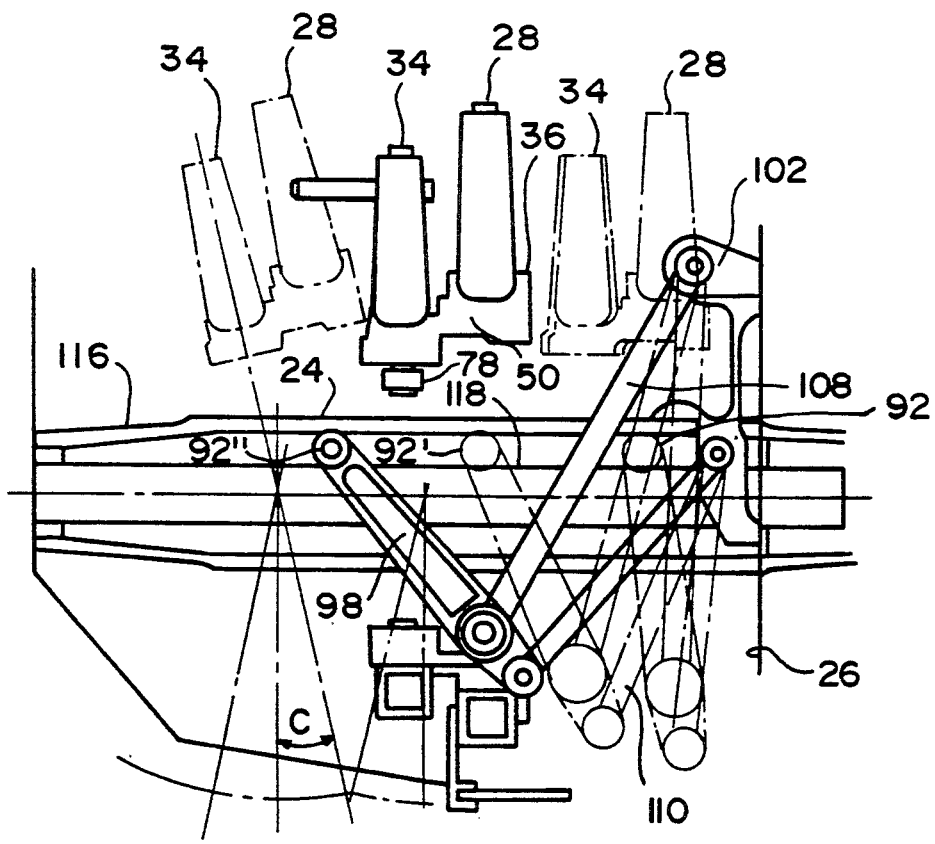
FIG. 4 is a schematic diagram showing the rotor and anti-drive assembly at two positions of progressively greater axial displacement but without rotor tilt and at a third, yet greater axial displacement positions with rotor tilt.

FIG. 4 illustrates the relative motion of the components of the anti-drive linkage 100 as the stationary ring and rotating ring move linearly along the axis of the main rotor shaft and tube 24, and tilt or pivot with respect to the main rotor shaft. Beginning at the right-hand side of that figure, rings 28 and 34 are shown in their respective positions when a relatively low magnitude of collective pitch control is applied to the stationary ring and virtually no cyclic pitch is applied by the control servos. In this condition, attachment 92 is seen located on a line 118 containing 92, 92' and 92".

When the magnitude of collective pitch input by the control servos is increased and cyclic pitch is substantially absent, rings 28, 34 move to their intermediate positions in FIG. 4, and attachment 92 move to 92'.

When the magnitude of collective pitch input by the control servos is increased further yet, to the maximun extent required, and the maximun magnitude of cyclic pitch is added to this collective pitch magnitude, rings 28, 34 displace axially and tilt angularly to the position shown at the left-hand side of FIG. 4. Nonetheless, even with the rings tilted and displaced to the exemities of their required travel, the anti-drive linkage 100 of this invention maintains attachment 92 substantially colinear with the other locations of attachment 92 (represented by line 118) when the control servos are less fully extended and the rotor is less fully displaced and tilted.

Angle C represents the angular displacement of the rotor when full cyclic pitch is applied in one direction, but the anti-drive linkage of this invention also has capacity to accomodate tilt through the same angle in the opposite direction. Yet, regardless of the direction in which the rotor is tilted, attachment 92 remains located substantially on line 118.

I claim:

1. A swashplate anti-drive system for the rotor of a rotary wing aircraft, comprising:
    a drive tube having a longitudinal axis;
    a stationary ring;
    a rotating ring driveably connected to the drive tube for rotation therewith;
    bearing means for supporting the rotating ring rotatably relative to the stationary ring and for axial displacement with the stationary ring along the axis of the drive tube;
    gimbal means driveably connected to the drive tube for rotation with the rotating ring and drive tube for supporting the rotating ring for pivotal movement with respect to the axis of the drive tube; and
    swashplate anti-drive linkage means connected to the stationary ring for restraining against rotation the stationary ring relative to the rotating ring without restricting axial displacement and angular tilting of the stationary ring relative to the drive tube, said swashplate anti-drive linkage means including a first bar pivotably connected to the stationary ring distant from the axis of the drive tube, a second bar and a third bar each pivotably connected to the first bar at first attachments located along said second bar and third bar, said first attachments being spaced along the first bar from the location of the connection between the first bar and the stationary ring, the second bar and the third bar each pivotably connected at second attachments to the aircraft, said second attachments being spaced along said second bar and third bar from the first attachments, the locations of said second attachments being fixed in position relative to each other.

2. The system of claim 1 further comprising a transmision adapted for driveable connection to an engine, the transmission having a casing within which the transmission is located, the casing having a surface adjacent the stationary ring on which said second attachments are located.

3. The system of claim 1 wherein the drive tube includes spline teeth extending along a length of the drive tube surface, and the gimbal means comprises:
    a trunnion ring surrounding the trunnion;
    a first set of gimbal bearings supporting the trunnion on the gimbal ring for pivotable movement about a first axis transverse to the axis of the drive tube; and
    a second set of gimbal bearings supporting the gimbal ring on the rotating ring for pivotable movement about a second axis transverse to the axis of the drive tube and substantially perpendicular to the first axis.

4. The system of claim 1 wherein the bearing means comprises:
    a bearing housing supported on a radially inner surface of the rotating ring facing the drive tube;
    a bearing retainer supported on a radially inner surface of the stationary ring facing the drive tube, defining a space between the bearing housing and bearing retainer;
    a bearing located in said space, having a first race contacting the bearing housing, a second race contacting the bearing retainer, and antifriction elements located between the first and second races and substantially aligned with the drive tube, for rotatably supporting the rotating ring relative to the stationary ring; and
    bearing retainer rings closing the axial ends of said space, fixed to the bearing housing and the bearing retainer, containing the bearing races and antifriction bearing elements within said space, whereby the bearing prevents axial displacement of the rotating ring relative to the stationary ring along the axis of the drive tube.

5. A swashplate anti-drive system for a rotary wing aircraft, comprising:
    a drive tube having a longitudinal axis;
    a rotor driveably connected to the drive tube, having rotor arms extending radially outward from a rotor center and spaced angularly about the axis of the drive tube, each arm extending along a pitch axis and adapted to support a rotor blade thereon;
    a stationary ring;
    a rotating ring driveably connected to the drive tube for rotation therewith;
    pitch links having a first end connected to the rotating ring at locations spaced radially from the center of the rotating ring and angularly about the axis of the drive tube, and having a second end connected to a rotor arm eccentric of the pitch axis;
    bearing means for supporting the rotating ring rotatably relative to the stationary ring and for axial displacement with the stationary ring along the axis of the drive tube;
    gimbal means drieveably connected to the drive tube for rotation with the rotating ring and drive tube for supporting the rotating ring for pivotal movement with respect to the axis of the drive tube; and
    swashplate anti-drive linkage means connected to the stationary ring for restraining against rotation the stationary ring relative to the rotating ring without restricting axial displacement and angular tilting of the stationary ring relative to the drive tube, said swashplate anti-drive linkagage means including a first bar pivotably connected to the stationary ring distant from the axis of the drive tube, a second bar and a third bar each pivotably connected to the first bar at first attachments located along said second bar and third bar, said first attachments being spaced along the first bar from the location of the connection between the first bar and the stationary ring, the second bar and the third bar each pivotably connected at second attachments to the aircraft, said second attachments being spaced along said second bar and third bar from the first attachments, the locations of said second attachments being fixed in position relative to each other.

6. The system of claim 5 wherein the drive tube includes spline teeth extending along a length of the drive tube surface, and the gimbal means comprises:
   a trunnion ring surrounding the drive tube, having spline teeth engaging the spline teeth of the drive tube;
   a gimbal ring surrounding the trunnion;
   a first set of gimbal bearings supporting the trunnion on the gimbal ring for pivotable movement about a first axis transverse to the axis of the drive tube; and
   a second set of gimbal bearings supporting the gimbal ring on the rotating ring for pivotable movement about a second axis transverse to the axis of the drive tube and substantially perpendicular to the first axis.

7. The system of claim 5 wherein the bearing means comprises:
   a bearing housing supported on a radially inner surface of the rotating ring facing the drive tube;
   a bearing retainer supported on a radially inner surface of the stationary ring facing the drive tube, defining a space between the bearing housing and bearing retainer;
   a bearing located in said space, having a first race contacting the bearing housing, a second race contacting the bearing retainer, and antifriction elements located between the first and second races and substantially aligned with the drive tube, for rotatably supporting the rotating ring relative to the stationary ring; and
   bearing retainer rings closing the axial ends of said space, fixed to the bearing housing and the bearing retainer, containing the bearing races and antifriction elements within said space, whereby the bearing prevents axial displacement of the rotating ring relative to the stationary ring along the axis of the drive tube.

8. An anti-drive device for the rotor control system of a rotary wing aircraft, comprising:
   a stationary ring having means spaced from the center of the ring for connecting the ring to an anti-drive linkage; and
   an anti-drive linkage including a first bar pivotably connected to the stationary ring at a location distant from the center of the stationary ring, a second bar and a third bar each pivotably connected to the first bar at first attachments located along said second bar and third bar, said first attachments being spaced along the first bar from the location of the connection between the first bar and the stationary ring, the second bar and the third bar each pivotably connected at second attachments to the aircraft, said second attachments being spaced along said second bar and third bar from the first attachments, the locations of said second attachments being fixed in position relative to each other.

9. The device of claim 8 further comprising rotor control servos connected to the stationary ring at attachments spaced radially from and angularly about the center of the rotating ring, said attachments permitting unrestricted angular tilting of the stationary ring relative to the control servos and substantially preventing relative displacement therebetween.

10. The device of claim 8 wherein the anti-drive linkage further comprises:
    a fourth bar supporting the second bar and third bar pivotably at the second attachments, the location of said second attachments being fixed in position on the fourth bar; and
    first and second clevis joints supporting the fourth bar against movement.

11. An anti-drive device for the rotor control system of a rotary wing aircraft, comprising:
    a stationary ring having means spaced from the center of the ring for attaching the ring to an anti-drive linkage; and
    anti-drive linkage means including a four bar linkage, connected by connecting means to the stationary ring, for restraining the stationary ring against rotation without restricting axial displacement and angular tilting of the stationary ring.

12. The device of claim 11 wherein the attaching means and the connection of the attaching means to the linkage means move along a substantially straight line regardless of the displacement of the stationary ring and angular tilting of the stationary ring.

* * * * *